United States Patent [19]

Jones

[11] Patent Number: 4,554,534
[45] Date of Patent: Nov. 19, 1985

[54] CONTROL CIRCUIT FOR A MULTI-BLOW FORMING PROCESS

[75] Inventor: William J. Jones, Toledo, Ohio

[73] Assignee: Helm Instrument Company, Maumee, Ohio

[21] Appl. No.: 468,481

[22] Filed: Feb. 22, 1983

[51] Int. Cl.$^4$ ............................................. G08B 21/00
[52] U.S. Cl. .................................... 340/665; 340/680; 73/862.53
[58] Field of Search ....................... 340/679, 680, 665; 73/770, 862.53, 862.67, 11, 862.54

[56] References Cited

U.S. PATENT DOCUMENTS

| 3,541,445 | 11/1970 | Taylor et al. | 324/99 R |
| 3,826,902 | 7/1974 | Claxton et al. | 73/770 X |
| 3,827,253 | 8/1974 | Mori | 324/99 D |
| 3,872,386 | 3/1975 | Luhowy | 324/98 |
| 4,023,044 | 5/1977 | Miller et al. | 340/680 X |
| 4,078,233 | 3/1978 | Frye | 324/99 D |
| 4,109,213 | 8/1978 | Holley et al. | 324/99 D |
| 4,274,282 | 6/1981 | Budraitis et al. | 340/665 X |
| 4,461,182 | 7/1984 | Jones, Jr. et al. | 73/770 X |

Primary Examiner—James L. Rowland
Assistant Examiner—Brian R. Tumm
Attorney, Agent, or Firm—Fraser & Clemens

[57] ABSTRACT

A load sensor generates a signal representing the amount of force applied to a workpiece during each blow of a multi-blow forming process. In a two blow process, a first amplifier is connected to the load sensor for amplifying the load sensor signals representing both blows in the forming process. A first gain control circuit is connected to the first amplifier for adjusting the amount of amplification to a first predetermined level. A logic control circuit is connected to the first amplifier for generating a first enabling signal during the first blow in the forming process and a second enabling signal during the second blow in the forming process. A second amplifier is connected to the first amplifier for amplifying the load sensor signals representing only the first blows in the forming process. A second gain control circuit is connected to the second amplifier for adjusting the amount of amplification to a second predetermined level. Circuits responsive to the signals generated by the first and second amplifiers and to the first and second enable signals are provided to measure the forces applied to the workpiece during each blow of the forming process.

32 Claims, 3 Drawing Figures

CONTROL CIRCUIT FOR A MULTI-BLOW FORMING PROCESS

BACKGROUND OF THE INVENTION

The present invention relates in general to an apparatus for measuring and controlling forming processes and in particular to a control circuit for measuring the forces applied to a workpiece during a cyclic multi-blow forming process.

It is well known that many forming processes, such as cold heading, forging, stamping, and the like, develop forces or loads in a workpiece which can be measured by strain gauges, piezoelectric elements, or other conventional deflection sensing elements. It is often desirable to provide a system for measuring such forces in terms of electrical signals which can be conditioned, amplified, and displayed to ultimately control the forming process. The use of such measured forces results in better workpiece quality, tool protection, and machine protection.

A multi-blow forming process is a common method of operating on a workpiece. In a typical heading operation, the workpiece is inserted into a die. A heading slide carrying a first punch is moved towards the die and performs a first impact operation on the workpiece head. The heading slide is then returned to the starting position, allowing a punch holder to index a second punch into position. On the next movement on the heading slide, the second punch imparts a second impact operation on the workpiece head. A load sensor is typically attached to the tooling or tooling holder to measure the amount of force applied to the workpiece during each impact or blow and to generate electrical load signals in response thereto.

Previous attempts to separate the two load signals representing the first and second blows of the forming process utilized mechanical cam switches mounted to the machine drive unit. The action of the heading slide caused movement of the cam switches, which movement was utilized to indicate which blow was occurring. However, such a mechanical sensing device is difficult to install and maintain in proper working order. Also, since a variety of parts are typically made on any given forming machine with a resultant difference in force for each part, it is desirable to adjust the varying load signal levels for the different blows to be within the nominal operating range of the measuring instrument and display. The mechanical cam switch sensing device described above provides no means for adjusting the varying load signal levels in the multi-blow forming process.

SUMMARY OF THE INVENTION

The present invention relates to a control circuit for measuring the forces applied to a workpiece during a cyclic multi-blow forming process. A load sensor generates a signal representing the amount of force applied to the workpiece during each blow of the forming process. In a two blow process, a first amplifier is connected to the load sensor for amplifying the load sensor signals representing both blows in the forming process. A first gain control circuit is connected to the first amplifier for adjusting the amount of amplification to a first predetermined level. A logic control circuit is connected to the first amplifier for generating a first enabling signal during the first blow in the forming process and a second enabling signal during the second blow in the forming process. A second amplifier is connected to the first amplifier for amplifying the load sensor signals representing only the first blows in the forming process. Similarly, a second gain control circuit is connected to the second amplifier for adjusting the amount of amplification to a second predetermined level. Means responsive to the signals generated by the first and second amplifiers and to the first and second enable signals are provided to measure the forces applied to the workpiece during each blow of the forming process.

It is an object of the present invention to provide a control circuit for measuring the forces applied to a workpiece during a cyclic multi-blow forming process.

It is another object of the present invention to provide a control circuit to automatically adjust the gain of each load signal in a multi-blow forming process to a predetermined level.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
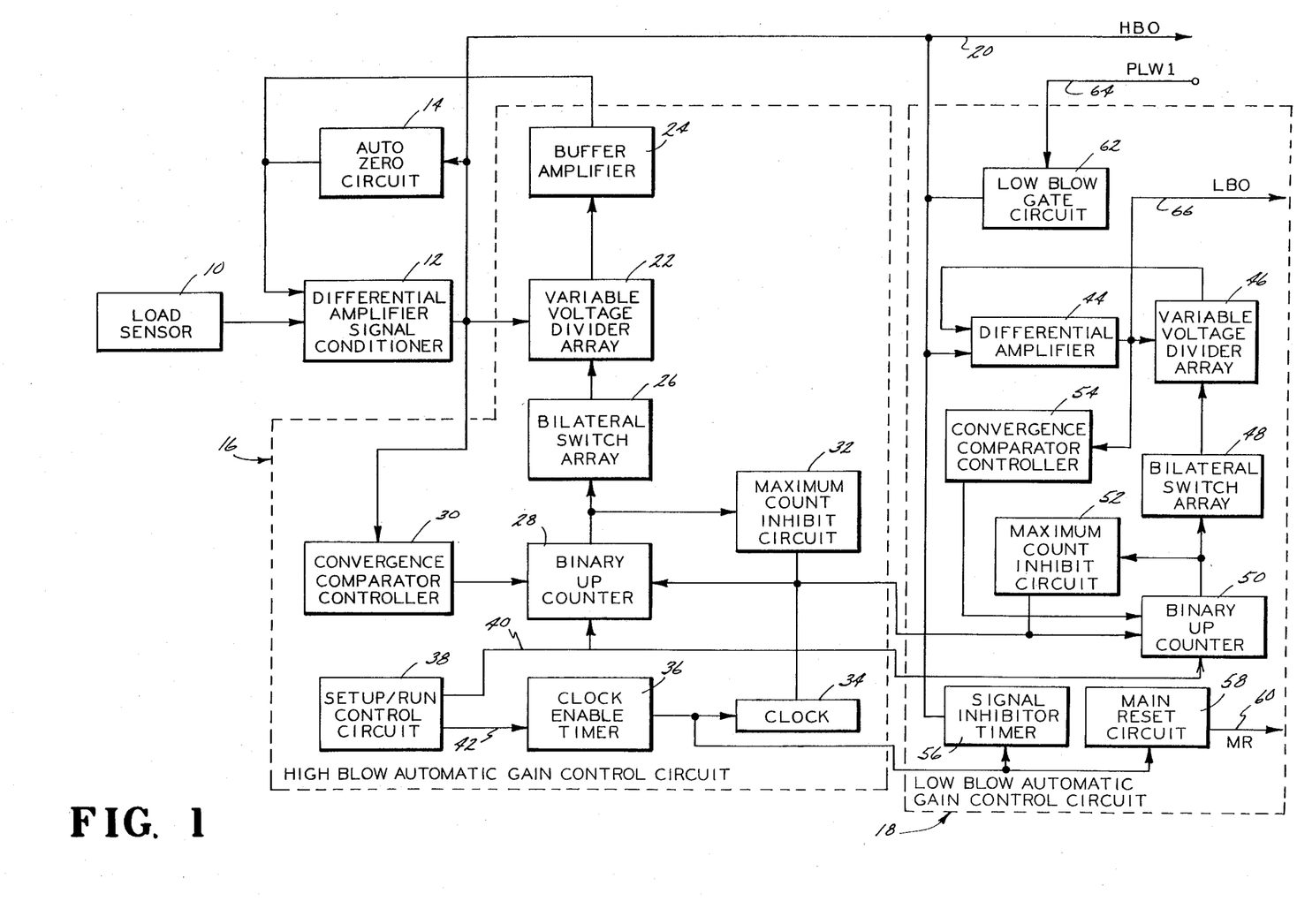
FIG. 1 is a block diagram of the automatic gain control circuit of the control circuit of the present invention.

Referring now to the drawings, there is illustrated in FIG. 1 a block diagram of the automatic gain control circuit of the control circuit of the present invention. The forces applied to a workpiece by a forming machine (not shown) are sensed by a load sensor 10, such a conventional Wheatstone bridge arrangement of strain gauges. The forming machine typically delivers two separate blows in cyclic fashion to the workpiece, the time between the first and second blows to one workpiece being approximately equal to the time between the second blow delivered to one workpiece and the first blow delivered to the next workpiece. Thus, the load signals generated by load sensor 10 consist of alternating blow load signals at approximately equal time intervals. The signals representing the second blows are typically larger in amplitude than the signals representing the first blows. Although described in terms of a two blow forming process, it will be appreciated that the present invention is easily adaptable to a forming process wherein three or more blows are applied to a workpiece in cyclic fashion.

The blow load signals generated by the load sensor 10 are typically only a few millivolts in amplitude. Accordingly, the blow load signals are fed to a differential amplifier signal conditioner circuit 12 for amplification. The signal conditioner 12 can consist of a conventional differential input operational amplifier. The output signal of the signal conditioner 12 represents the amplified blow load signals of both the first (low) and second (high) blows of the forming process sensed by the load sensor 10. An auto zero circuit 14 can be connected between the output and the input of the signal conditioner 12 to control the feedback path. The auto zero circuit 14 is described in detail in U.S. Pat. No. 4,119,918 to Moser.

The output of the signal conditioner 12 is connected to a high blow automatic gain control circuit 16, a low blow automatic gain control circuit 18, and a high blow output (HBO) line 20. The gain control circuits 16 and 18 are provided to automatically adjust the amount of amplification of the high blow signals and low blow signals generated by the load sensor 10. The structure and operation of the gain control circuits 16 and 18 are quite similar and will be described in detail below.

The high blow automatic gain control circuit 16 is inserted in the feedback path between the output and the input of the signal conditioner 12. The gain control circuit 16 includes a variable voltage divider array 22 connected to the output of the signal conditioner 12. The variable voltage divider array 22 is connected through a voltage follower buffer amplifier 24 to the input of the signal conditioner 12. The voltage divider array 22 varies the voltage differential between the output of the signal conditioner 12 and the input, thereby varying the amount by which the signal conditioner 12 amplifies the signals from the load sensor 10.

The variable voltage divider array 22 can consist of a plurality of resistors (not shown) connected in series. A bilateral switch array 26 is provided such that each resistor in the variable voltage divider array 22 has an individual bilateral switch connected thereacross. When a switch in the bilateral switch array 26 is closed, the corresponding resistor in the variable voltage divider array 22 is short circuited out of the feedback circuit of the differential amplifier signal conditioner 12. Thus, when all of the switches in the bilateral switch array 26 are open, none of the resistors in the variable voltage divider array 22 are short circuited. The effective resistance of the variable voltage divider array 22 is at a maximum and, therefore, the gain of the signal conditioner 12 will be at a maximum. Similarly, when all of the switches in the bilateral switch array 26 are closed, all of the resistors in the variable voltage divider array 22 will be short circuited such that the gain of the signal conditioner 12 will be at a minimum.

The operation of the switches in the bilateral switch array 26 is electronically controlled by a binary up counter 28. The binary outputs of the counter 28 are individually connected to the switches in the bilateral switch array 26. When the value of the counter 28 is reset to zero, all of the outputs of the counter 28 will carry logical zero signals. As a result, all of the switches in the bilateral switch array 26 will be open and the resistance of the variable voltage divider array 22 will be at a maximum. As the counter 28 begins to count up, the outputs of the counter 28 will switch from logical zero signals to logical one signals and vice versa in accordance with the binary value of the counter 28. Thus, the resistance of the variable voltage divider array 22 will be linearly decreased as the value of the binary counter 28 increases. As the resistance of the variable voltage divider array 22 decreases, the gain of the signal conditioner 12 will also be decreased.

A convergence comparator controller 30 is connected to the output of the signal conditioner 12. The convergence comparator controller 30 compares the output signal generated by the signal conditioner 12 with a predetermined nominal signal level to adjust the amount of amplification of the signal conditioner 12 to a desired level. The nominal signal level is selected to be well within the nominal operating range of the measurement and display instrumentation of the control circuit. As described above, the resistance of the variable voltage divider array 22 and the gain of the signal conditioner 12 are initially at a maximum. As the counter 28 counts up, the resistance of the variable voltage divider array 22 and the gain of the signal conditioner 12 are decreased. When the output signal level of the signal conditioner 12 drops below the predetermined nominal signal level, the convergence comparator controller 30 generates a disabling signal to the counter 28 to stop counting up. Since the output of the signal conditioner 12 contains both high and low blow load signals, the convergence comparator controller 30 will generate the disabling signal only when the level of both blow load signals drop below the nominal signal level. Thus, the amount of amplification of the signal conditioner 12 is automatically adjusted to the desired nominal level for the high blow load signals.

If the counter 28 counts up to a maximum value wherein all of the binary outputs carry logical one signals, all of the switches in the bilateral switch array 26 will be closed. Thus, the resistance of the variable voltage divider array 22 and, consequently, the gain of the signal conditioner 12 will be at a minimum. However, even when such a minimum gain condition arises, it may occur that the output level of the high blow load signals generated by the signal conditioner 12 still exceeds the nominal signal level generated by the convergence comparator controller 30. In order to prevent the counter 28 from continuing to count further, i.e., from resetting to zero because of an overflow condition, a maximum count inhibit circuit 32 is provided. The maximum count inhibit circuit 32 is responsive to the output signals of the binary up counter 28 such that the counter 28 is prevented from counting further when the maximum value has been reached. Thus, the gain of the signal conditioner 12 is prevented from oscillating if the signal level of the signal conditioner 12 never drops below the nominal signal level generated by the convergence comparator controller 30.

The counter 28 is enabled to count up by clock signals generated by a clock 34. The maximum count inhibit circuit 32 can be connected to the clock input line of the counter 28 to prevent the clock 34 from further actuating the counter 28 when the maximum count has been reached. The clock 34 is responsive to an enable signal generated by a clock enable timer 36. The clock enable timer 36 and the binary up counter 28 are responsive to signals generated by a setup/run control circuit 38.

During the setup time of the forming machine, an operator moves a manually operable switch (not shown) in the setup/run control circuit 38 to a setup position. In response thereto, the setup/run control circuit 38 generates a signal on a reset line 40 to the counter 28. As a result, the value of the counter 28 is reset and held at zero such that the gain of the signal conditioner 12 is maintained at a maximum level. Also, a signal is generated on an enable line 42 to the clock enable timer 36 so as to disable the timer 36 and, consequently, prevent the clock 34 from generating clock signals to the counter 28.

Once the forming machine is running and the operator has determined that good workpieces are being formed, the operator moves the manually operable switch to a run position. In response thereto, the setup/run control circuit 38 removes the signal from the reset line 40, enabling the counter 28 to count up in response to clock signals from the clock 34. At the same time, an enable signal is generated on the enable line 42 to the clock enable timer 36. The clock enable timer 36 generates an enable signal, typically approximately four seconds in duration, to the clock 34. This clock enable signal allows the clock 34 to output a train of clock pulses to the binary up counter 28 for approximately four seconds, during which time the high blow automatic gain control circuit 16 will automatically adjust the gain of the signal conditioner 12 to the desired nominal level. After the termination of the four second enable pulse generated by the clock enable timer 36, the high blow automatic gain control circuit 16 will hold the gain of the signal conditioner 12 at the desired nominal level.

The low blow automatic gain control circuit 18 is quite similar to the above-described high blow automatic gain control circuit 16 in structure and operation. The output of the signal conditioner 12 is fed to a signal input line of a low blow differential amplifier 44 of the low blow automatic gain control circuit 18. A variable voltage divider array 46, a bilateral switch array 48, a binary up counter 50, a maximum count inhibit circuit 52, and a convergence comparator controller 54 are all provided in the low blow automatic gain control circuit 18 and are connected in a manner similar to that described above so as to automatically adjust the gain of the differential amplifier 44 to a predetermined nominal level for the low blow load signal. The variable voltage divider array 46 is directly connected to a second input of the differential amplifier 44. The binary up counter 50 is connected to the reset line 40 from the setup/run control circuit 38. Similarly, the counter 50 is also connected to the clock 34 to receive the train of clock pulses. A signal inhibitor timer 56 is connected to the output of the clock enable timer 36 so as to receive the four second clock enable pulse. The signal inhibitor timer 56 is connected to the signal input line of the differential amplifier 44. When the four second clock enable pulse is generated, the signal inhibitor timer 56 disables the signal on the signal input line to the differential amplifier 44 for approximately two seconds. Thus, the low blow automatic gain control circuit 18 is disabled for the first two seconds of the four second convergence time allowed by the clock enable timer 36. This is done to ensure that the gain setting for the high blow load signals has been set by the high blow automatic gain control circuit 16 before the low blow automatic gain control circuit 18 automatically sets the gain of the differential amplifier 44. The low blow automatic gain control circuit 18 therefore has the two remaining seconds in the four second convergence time in which to perform the automatic gaining process described above for the low blow load signals.

The clock enable timer 36 is also connected to a main reset circuit 58. During the four second clock enable pulse, the main reset circuit 58 generates a signal on a main reset (MR) line 60. As will be described in greater detail below, the main reset signal is generated to ensure that no alarms will be activated during the above-described automatic gain adjusting process.

A low blow gate circuit 62 is also connected to the signal input line of the differential amplifier 44. Since the signal input line to the differential amplifier 44 carries both the high and low blow load signals, the low blow gate circuit 62 is provided to selectively disable the high blow load signals such that the differential amplifier 44 receives only the low blow load signals. The low blow gate circuit 62 is responsive to a first peak look window (PLW1) line 64 for selectively disabling the high blow load signals to the differential amplifier 44. The output of the differential amplifier 44 is connected to a low blow output (LBO) line 66. The HBO line 20 and the LBO line 66 can be connected to a conventional means for measuring the amount of force applied to the workpiece during each of the high and low blows.

Figure 2:
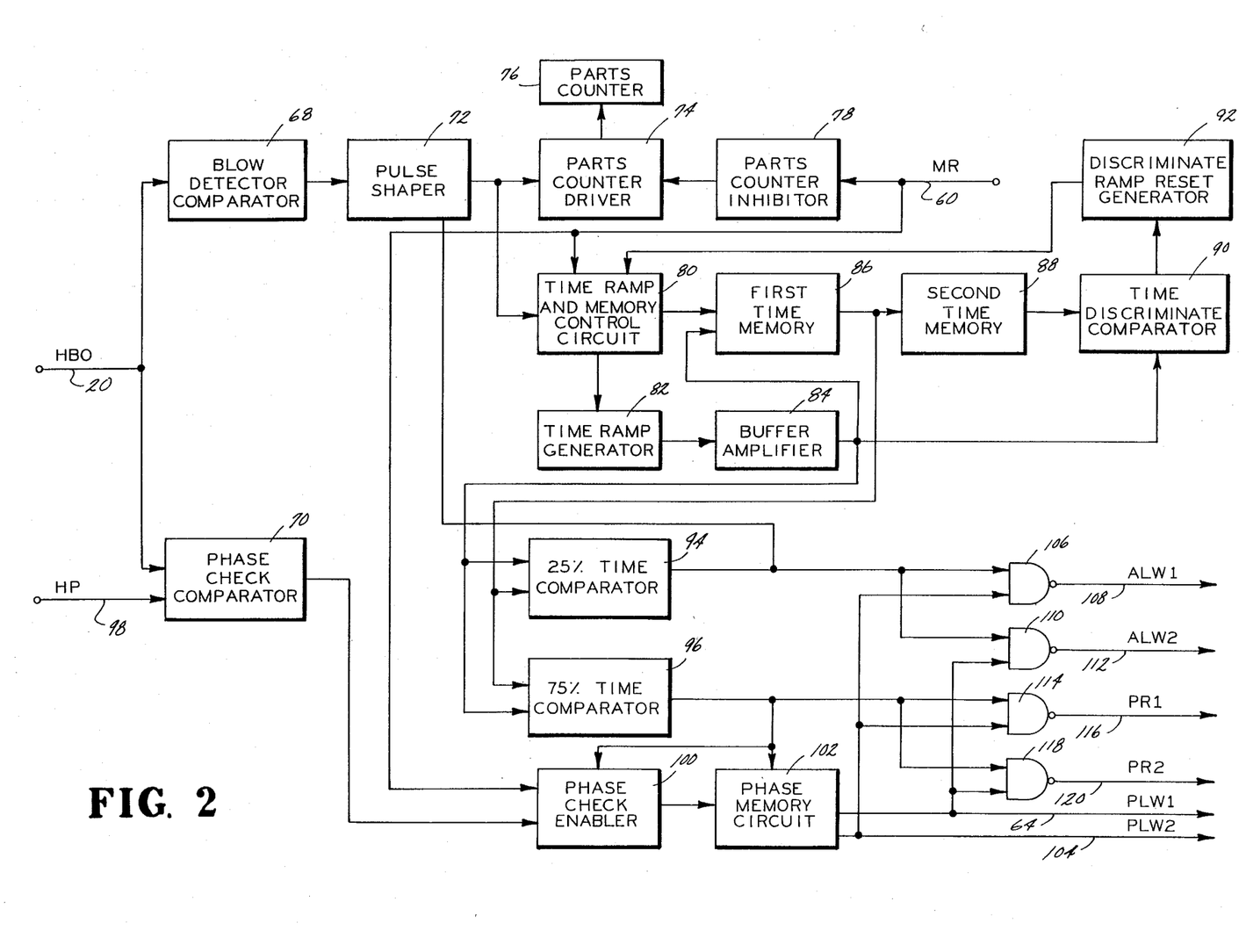
FIG. 2 is a block diagram of the logic control circuit of the control circuit of the present invention.

Referring now to FIG. 2, there is illustrated a block diagram of the logic control circuit of the present invention. The HBO line 20 from the high blow automatic gain control circuit 16 is connected to a blow detector comparator 68 and a phase check comparator 70. The blow detector comparator compares the incoming signal on the HBO line 20 against a fixed threshold value, which typically can be equal to nine percent of the nominal load voltage. When a high or low blow load signal crosses this threshold voltage, the blow detector comparator 68 generates a signal to a pulse shaper 72. The pulse shaper 72 can be a conventional delay flip-flop circuit provided to square up the input pulse from the blow detector comparator 68 and to reject noise or other spurious signals. Thus, one output pulse is generated by the pulse shaper 72 for each high or low blow load input signal.

The output of the pulse shaper 72 is connected to a parts counter driver 74. The parts counter driver 74 divides the number of load pulses from the pulse shaper 72 by two to obtain a number representing the actual number of workpieces operated on by the forming machine. The parts counter driver 74 is connected to a mechanical or electronic parts counter 76 for displaying the actual workpiece count. A parts counter inhibitor 78 is connected between the MR line 60 and the parts counter driver 74. When a main reset signal is applied to the MR line 60, as during the above-described automatic gain control processes, the parts counter inhibitor 78 inhibits the parts counter driver 74 from counting. Thus, workpieces which are formed during the automatic gain control processes are not counted by the parts counter driver 74.

The output of the pulse shaper 72 is also connected to a time ramp and memory control circuit 80 for controlling the recording of the machine stroke rate timing and the updating of the stroke time. The stroke time is represented by a direct current voltage generated by a time ramp generator 82. The time ramp generator 82 is connected to the time ramp and memory control circuit 80 and can be a constant current source operational amplifier circuit which produces a linear ramp voltage with respect to the passage of time. The linear ramp voltage is fed to a buffer amplifier 84 to obtain sufficient power to drive the circuitries associated with the time-stroke relationships. The MR line 60 is also connected to the time ramp and memory control circuit 80.

First and second time memories 86 and 88, respectively, are provided to store the peak analog voltage supplied by the buffer amplifier 84. The first and second time memories 86 and 88 can be conventional analog peak storage circuits. The time ramp and memory control circuit 80 and the buffer amplifier 84 are both connected to the first time memory 86. The output of the first time memory 86 is connected to the input of the second time memory 88.

Upon the generation of a pulse representing a high or low blow load signal by the pulse shaper 72, the time ramp and memory control circuit 80 generates two control pulses in sequence. The first pulse is fed to the first time memory 86, enabling it to sample and hold the linear ramp voltage from the buffer amplifier 84. The first time memory 86 stores the peak signal of the linear ramp voltage. The second pulse generated by the time ramp and memory control circuit 80 is fed to the time ramp generator 82. Upon receipt of the second pulse, the linear ramp voltage generated by the time ramp generator 82 is reset to zero. Thus, as long as there are first and second pulses representing the high and low blow load signals being produced by the pulse shaper 72, the time ramp generator 82 cyclically generates a linear ramp voltage output which is reset on every blow. Also, the first time memory 86 is cyclically reset and updated on the amount of time existing between each blow as represented by the peak of the linear voltage ramp generated by the buffer amplifier 84.

The second time memory 88 is provided for a longer term storage time for the stroke time of the forming machine. The second time memory 88 is an analog peak circuit which is directly fed by the first time memory 86. However, the second time memory 88 is not reset on each stroke of the forming machine by the time ramp and memory control circuit 80, as is the first time memory 86. The outputs of the second time memory 88 and the buffer amplifier 84 are fed to a time discriminate comparator 90. The time discriminate comparator 90 compares the signal representing the current stroke time generated by the buffer amplifier 84 with the stored stroke time signal generated by the second time memory 88. When the signal from the buffer amplifier 84 increases past a predetermined maximum percentage of the stored signal in the second time memory 88, typically one hundred ten percent, the time discriminate comparator 90 generates a signal to a discriminate ramp reset generator 92 which, in turn, generates a signal to the time ramp and memory control circuit 80 to reset the time ramp generator 82 to zero as described above. Such a condition can occur whenever the pulse shaper 72 does not generate a pulse representing a blow load signal when it normally otherwise would, such as when a workpiece is missing and no blow can be applied thereto. In such an instance, the linear ramp voltage from the time ramp generator 82 will continually rise up to the predetermined maximum percentage of the stroke time voltage and be reset even when blow load signals are missing.

The output of the first time memory 86 is connected to a 25% time comparator 94 and a 75% percent time comparator 96. The output of the buffer amplifier 84 is also connected to each of the time comparators 94 and 96. The 25% time comparator 94 generates an output pulse when the linear ramp voltage signal generated by the buffer amplifier 84 increases past the twenty-five percent level of the peak value of the stored ramp signal from the first time memory 86. Similarly, the 75% time comparator 96 generates an output pulse when the linear ramp voltage signal from the buffer amplifier 84 increases past the seventy-five percent level of the peak value of the ramp signal stored in the first time memory 86. As will be described in greater detail below, the output pulses from the time comparators 94 and 96 are utilized to generate control signals relating to feedback control, peak load level updates, and alarm responses relating to the blow loads generated by the forming machine.

As mentioned previously, the HBO line 20 is connected to the phase check comparator 70. The phase check comparator 70 compares the signal on the HBO line 20 with a signal on a high peak (HP) line 98 representing ninety-five percent of the peak of a typical high blow load signal. The source of the signal on the HP line 98 will be discussed below. When the signal on the HBO line 20 exceeds the signal on the HP line 98, the phase check comparator 70 generates a output pulse indicating that the current blow load signal represents a high blow load signal. The output pulse from the phase check comparator 70 is fed to a phase check enabler 100. The phase check enabler 100 is responsive to the output signal from the 75% time comparator 96 for clocking a counter (not shown) in the phase check enabler 100 such that only a predetermined number of pulses, typically two, are generated after the signal on the MR line 60 is removed. The pulse shaper 72 is responsive to the output signals of the 25% time comparator 94 for resetting the output pulse of the pulse shaper 72 to zero during the generation of the twenty-five percent time pulse. The phase check enabler 100 is also connected to the MR line 60 to allow pulses to be generated by the phase check enabler 100 so long as a signal is generated on the MR line 60.

The output of the phase check enabler 100 is connected to a phase memory circuit 102 to establish the proper phasing. The phase memory circuit 102 is also connected to the output of the 75% time comparator 96 for its clocking signals. The phase memory circuit 102 can be a conventional delay flip-flop circuit. Each time a pulse is generated by the 75% time comparator 96, the outputs of the phase memory circuit 102 change state. The non-inverting output of the phase memory circuit 102 is connected to the first peak look window (PLW1) line 64. The inverting output of the phase memory circuit 102 is connected to a second peak look window (PLW2) line 104.

The output signals from the 25% time comparator 94, the 75% time comparator 96, and the phase memory circuit 102 are utilized to generate control signals to the rest of the control circuit. The output signals of the 25% time comparator 94 and the inverting output of the phase memory circuit 102 are connected to a NAND gate 106 for generating a signal on a first alarm look window (ALW1) line 108. The output signals of the 25% time comparator 94 and the non-inverting output of the phase memory circuit 102 are connected to a NAND gate 110 for generating a signal on a second alarm look window (ALW2) line 112. The output signals from the 75% time comparator 96 and the non-inverting output of the phase memory circuit 102 are connected to a NAND gate 114 for generating an output signal on a first peak reset (PR1) line 116. The output signals from the 75% time comparator 96 and the non-inverting output of the phase memory circuit 102 are connected to a NAND gate 118 for generating a control signal on a second peak reset (PR2) line 120. The signals on the first and second alarm look window lines 108 and 112, the first and second peak reset lines 116 and 120, and the first and second peak look window lines 64 and 104 are utilized to generate alarm and peak enable signals for the control circuit.

Figure 3:
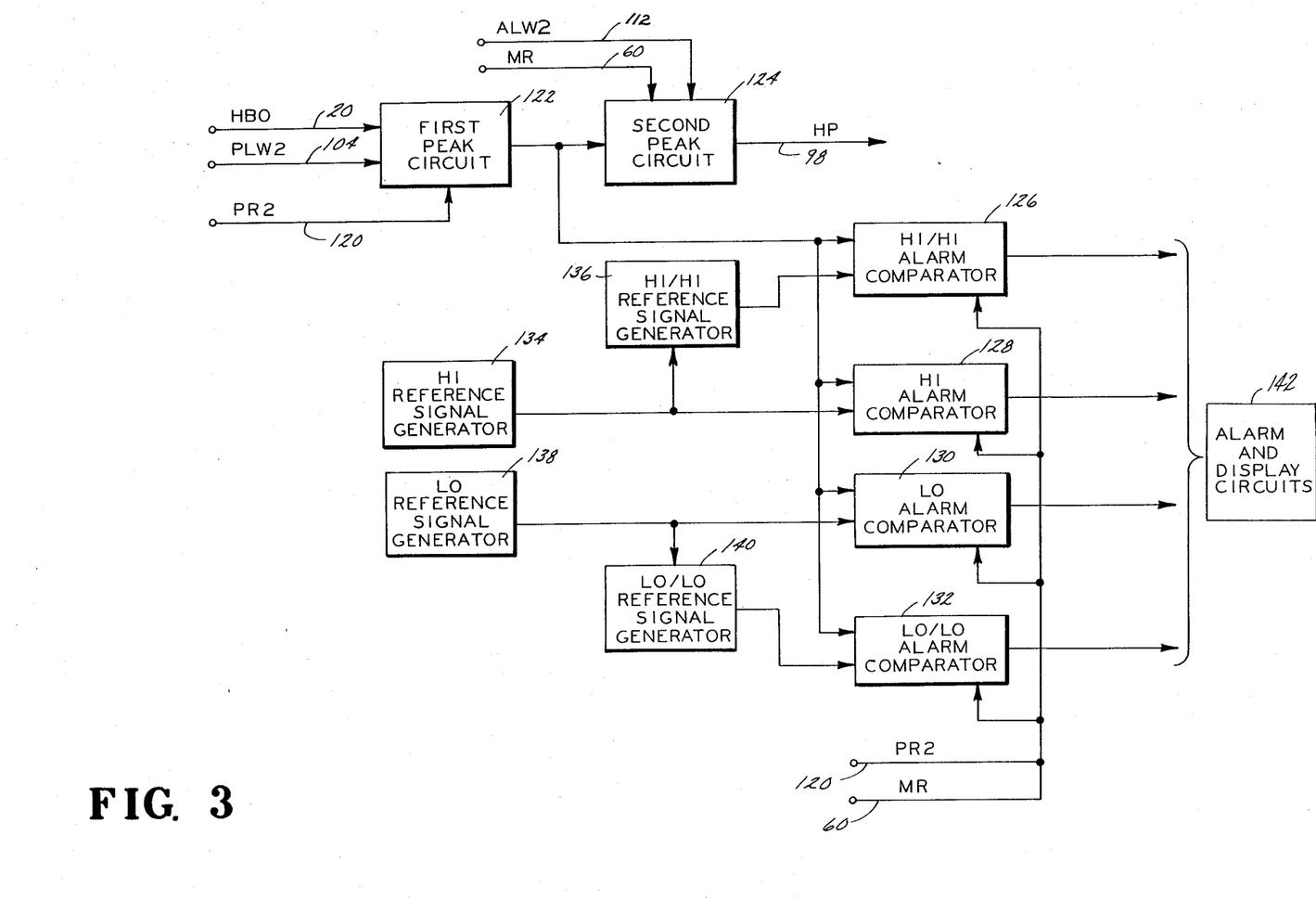
FIG. 3 is a block diagram of one of the alarm/peak circuit of the control circuit of the present invention.

Referring now to FIG. 3, there is illustrated a block diagram of one alarm/peak circuit of the control circuit of the present invention. In practice, the present invention utilizes two such alarm/peak control circuits, one for the high blow load signals and one for the low blow load signals to provide an indication of the forces applied to the workpiece. However, since the two alarm/peak control circuits are virtually identical, only the high blow load alarm/peak circuit will be described. The HBO line 20 and the second peak look window (PLW2) line 104 are connected to a first peak circuit 122. The output of the first peak circuit 122 is connected to a second peak circuit 124. The second peak circuit 122 is also connected to the MR line 60 and the second alarm look window line (ALW2) 112. The output of the second peak circuit 124 is connected to the high peak (HP) line 98.

In operation, the first peak circuit 122 samples and holds the peak of the signal on the HBO line 20 whenever an enabling signal is present on the second peak look window (PLW2) line 104. The peak signal stored in the first peak circuit 122 is reset to zero when a reset pulse on the second peak reset (PR2) line 120 is generated. However, the peak signal stored in the second peak circuit 124 is not reset to zero when such a pulse is generated. The second peak circuit 124 updates the stored peak signal from the first peak circuit 124 when an enable signal is applied on the second alarm look window (ALW2) line 112. Thus, the output signal from the second peak circuit 124 on the HP line 98 is a relatively constant signal representing the peak of the high blow load signal.

The output of the first peak circuit 122 is also connected to a HI/HI alarm comparator 126, a HI alarm comparator 128, a LO alarm comparator 130, and a LO/LO alarm comparator 132. An operator manually adjusts a HI reference signal generator 134 to generate a reference signal which is a desired percentage greater than the nominal blow load signal. The signal from the HI reference signal generator 134 is fed to the HI alarm comparator 128 and to a HI/HI reference signal generator 136. The HI/HI reference signal generator 136 automatically generates a reference signal which is a predetermined percentage, typically ten percent, greater than the signal generated by the HI reference signal generator 134. The signal from the HI/HI reference signal generator 136 is fed to the HI/HI alarm comparator 126.

Similarly, the operator also manually adjusts a LO reference signal generator 138 to generate a reference signal which is a desired percentage below the nominal blow load signal level. The output of the LO reference signal generator 138 is fed to the LO alarm comparator 130. A LO/LO reference signal generator 140 is responsive to the signal from the LO reference signal generator 138 for automatically generating a reference signal which is a predetermined percentage, typically ten percent, below the signal generated by the LO reference signal generator 138. The output of the LO/LO reference signal generator 140 is fed to the LO/LO alarm comparator 132.

The outputs of the alarm comparators 126, 128, 130, and 132 are individually connected to conventional alarm and display circuitry 142 for generating audible and visual signals notifying an operator of an alarm condition. The outputs of the HI alarm comparator 128, the LO alarm comparator 130, and the LO/LO alarm comparator 132 can also be connected to conventional counters for counting the number of alarm conditions sensed by the control circuit. The output of the HI/HI alarm comparator 126 can be connected to a stop relay (not shown) of the forming machine. Since the HI/HI alarm comparator 126 generates an alarm signal only when the level of the blow load signal greatly exceeds the nominal blow load signal level, a condition which can result in immediate damage to the forming machine, the HI/HI alarm comparator 126 is connected to the stop relay to immediately stop the operation of the forming machine. The alarm comparators 126, 128, 130, and 132 are all connected to the second peak reset (PR2) line 120 (except comparator 126) and the main reset (MR) line 60. When a reset signal is present on either of the lines 60 or 120, the comparators 126 (except second peak reset line 120), 128 130, and 132 are disabled such that no alarm signal can be generated therefrom. Thus, no alarm signals can be generated during the automatic gain adjusting processes described above.

In accordance with the provisions of the patent statutes, the principal and mode of operation of the present invention have been explained and illustrated in its preferred embodiment. However, it must be appreciated that the present invention can be practiced otherwise than as specifically explained and illustrated without departing from its spirit or scope.

What is claimed is:

1. A control circuit for measuring the forces applied to a workpiece during two blows of a multi-blow forming process comprising:
   load sensor means for generating a signal representing the amount of force applied to the workpiece during each blow of the forming process;
   first amplifier means connected to said load sensor means for generating a first amplified signal;
   first gain control means connected to said first amplifier means for adjusting the amount of amplification of said first amplified signal to a first predetermined level;
   logic control means connected to said first amplifier means for generating a first enable signal during a first blow in the forming process and for generating a second enable signal during a second blow in the forming process;
   second amplifier means connected to said first amplifier means for generating a second amplified signal;
   second gain control means connected to said second amplifier means for adjusting the amount of amplification of said second amplified signal to a second predetermined level; and
   means responsive to said first and second amplified signals and said first and second enable signals for indicating the forces applied to the workpiece during the first and second blows of the forming process.

2. The invention defined in claim 1 wherein said first and second amplifier means each include a differential input operational amplifier.

3. The invention defined in claim 1 wherein said first and second gain control means each include a variable voltage divider means connected in a feedback path between an output and an input of said first and second amplifier means, respectively.

4. The invention defined in claim 3 wherein said variable voltage divider means includes a plurality of series connected resistors and means for selectively short circuiting each of said resistors according to a predetermined sequence.

5. The invention defined in claim 4 wherein said means for selectively short circuiting includes a plurality of bilateral switches, each individual to a respective one of said resistors, and a counter means connected to said switches for selectively actuating each switch to short circuit said respective resistor according to a predetermined sequence.

6. The invention defined in claim 5 further including clock means for actuating said counter means.

7. The invention defined in claim 6 further including means connected to said counter means for disabling said counter means when a predetermined maximum count has been reached.

8. The invention defined in claim 6 further including timer means for disabling said clock means after a predetermined period of time.

9. The invention defined in claim 6 further including means for generating a signal representing said first predetermined level and means responsive to said first predetermined level signal and said first amplified signal for disabling said counter means when said first amplified signal is less than said first predetermined level.

10. The invention defined in claim 6 further including means for generating a signal representing said second predetermined level and means responsive to said second predetermined level signal and said second amplified signal for disabling said counter means when said second amplified signal is less than said second predetermined level.

11. The invention defined in claim 1 wherein said logic control means includes means for generating a first reference signal and comparison means responsive to said first reference signal and said first amplified signal for generating said first enabling signal when said first amplified signal exceeds said first reference signal.

12. The invention defined in claim 1 wherein said logic control means includes means responsive to said first amplified signal for counting the number of workpieces formed in the forming process.

13. The invention defined in claim 11 wherein said logic control means includes means responsive to said first amplified signal for generating first and second alarm enable signals.

14. The invention defined in claim 13 wherein said indicating means includes means for generating a second reference signal and is responsive to said first amplified signal, said second reference signal, and said first alarm enable signal for generating an alarm signal when said first amplified signal differs from said second reference signal by a predetermined amount while said first alarm enable signal is being generated.

15. The invention defined in claim 13 wherein said indicating means further includes means for generating a second reference signal and said indicating means is responsive to said second amplified signal, said second alarm enable signal, and said second reference signal for generating an alarm signal when said second amplified signal differs from said second reference signal by a predetermined amount while said second alarm enable signal is being generated.

16. The invention defined in claim 1 further including display means connected to said indicating means for displaying an indication of the force applied to the workpiece during the first and second blows of the forming process.

17. A control circuit for measuring the forces applied to a workpiece during a cyclic two-blow forming process comprising:
load sensor means for generating a signal representing the amount of force applied to the workpiece during each blow of the forming process;
first amplifier means connected to said load sensor means for generating a first amplified signal representing the amount of force applied to the workpiece during each blow of the forming process;
first gain control means connected to said first amplifier means for adjusting the amount of amplification of said first amplified signal to a predetermined level;
logic control means connected to said first amplifier means for generating a first enable signal during a first blow in the forming process and for generating a second enable signal during a second blow in the forming process;
second amplifier means connected to said first amplifier means and said logic control means for generating a second amplified signal representing the amount of force applied to the workpiece only during the first blow of the forming process;
second gain control means connected to said second amplifier means for adjusting the amount of amplification of said second amplified signal to a second predetermined level; and
means responsive to said first and second amplified signals and to said first and second enable signals for indicating the forces applied to the workpiece during the first and second blows of the forming process.

18. The invention defined in claim 17 wherein said first and second amplifier means each include a differential input operational amplifier.

19. The invention defined in claim 17 wherein said first and second gain control means each include a variable voltage divider means connected in a feedback path between an output and an input of said first and second amplifier means, respectively.

20. The invention defined in claim 19 wherein said variable voltage divider means includes a plurality of series connected resistors and means for selectively short circuiting each of said resistors according to a predetermined sequence.

21. The invention defined in claim 20 wherein said means for selectively short circuiting includes a plurality of bilateral switches, each individual to a respective one of said resistors and a counter means connected to said switches for selectively actuating each switch to short circuit said respective resistor according to a predetermined sequence.

22. The invention defined in claim 21 further including clock means for actuating said counter means.

23. The invention defined in claim 22 further including means connected to said counter means for disabling said counter means when a predetermined maximum count has been reached.

24. The invention defined in claim 22 further including timer means for disabling said clock means after a predetermined period of time.

25. The invention defined in claim 22 further including means for generating a signal representing said first predetermined level and means responsive to said first predetermined level signal and said first amplified signal for disabling said counter means when said first amplified signal is less than said first predetermined level.

26. The invention defined in claim 22 further including means for generating a signal representing said second predetermined level and means responsive to said second predetermined level signal and said second amplified signal for disabling said counter means when said second amplified signal is less than said second predetermined level.

27. The invention defined in claim 17 wherein said logic control means includes means for generating a first reference signal and comparison means responsive to said first reference signal and said first amplified signal for generating said first enabling signal when said first amplified signal exceeds said first reference signal.

28. The invention defined in claim 17 wherein said logic control means includes means responsive to said first amplified signal for counting the number of workpieces formed in the forming process.

29. The invention defined in claim 27 wherein said logic control means includes means responsive to said first amplified signal for generating first and second alarm enable signals.

30. The invention defined in claim 29 wherein said indicating means includes means for generating a second reference signal and is responsive to said first amplified signal, said second reference signal, and said first alarm enable signal for generating an alarm signal when said first amplified signal differs from said second reference signal by a predetermined amount while said first alarm enable signal is being generated.

31. The invention defined in claim 29 wherein said indicating means further includes means for generating a second reference signal and said indicating means is responsive to said second amplified signal, said second alarm enable signal, and said second reference signal for generating an alarm signal when said second amplified signal differs from said second reference signal by a predetermined amount while said second alarm enable signal is being generated.

32. The invention defined in claim 17 further including display means connected to said indicating means for displaying an indication of the force applied to the workpiece during the first and second blows of the forming process.

* * * * *